United States Patent Office 2,806,009
Patented Sept. 10, 1957

2,806,009

IMPROVEMENT IN THE VACUUM DEHYDRATION OF THERMOSETTING RESINS PREPARED BY THE REACTION OF A PHENOL, AN ALDEHYDE, AND SUBSTANTIALLY PETROLEUM HYDROCARBON-INSOLUBLE PINE WOOD RESIN IN AQUEOUS MEDIUM

John R. Lewis and Kenneth O. Blanchard, Wilmington, Del., assignors to Hercules Powder Company, Wilmington, Del., a corporation of Delaware No Drawing. Application December 30, 1954,
Serial No. 478,894

2 Claims. (Cl. 260—25)

The present invention relates to an improved process for the preparation of a modified phenol-aldehyde thermosetting resin.

Phenol-aldehyde type thermosetting resins are known to be useful for molding, laminating and bonding operations. Due to the high cost of phenol, attempts have been made to modify these resins by replacing part of the phenol with a less expensive material. It is known, for example, that the phenol may be partially replaced with substantially petroleum hydrocarbon-insoluble pine wood resin prior to reaction of the phenol with the aldehyde or by extending the finished resin with the pine wood resin. The former method of modification is the one generally preferred because when the substantially petroleum hydrocarbon-insoluble pine wood resin is added prior to reaction of the phenol and the aldehyde, it enters into reaction with the aldehyde and possibly with the phenol, thus chemically modifying, instead of physically modifying the product.

In the modification of phenol-aldehyde thermosetting resins by addition of substantially petroleum hydrocarbon-insoluble pine wood resin prior to reaction with the phenol and the aldehyde, the procedure commonly used comprises reacting a phenol, an aldehyde and a substantially petroleum hydrocarbon-insoluble pine wood resin simultaneously in aqueous medium until the desired degree of reaction has occurred. It is then necessary to remove the water that is present and a widely used and convenient method of assuring complete removal of the water comprises dehydrating the resin under vacuum with agitation.

In the vacuum dehydration of substantially petroleum hydrocarbon-insoluble pine wood resin-modified phenol-aldehyde thermosetting resins, considerable difficulty is often encountered due to the fact that such resins have a much higher viscosity than unmodified phenol-aldehyde resins.

In a typical vacuum dehydration of a phenol-aldehyde thermosetting resin, vacuum is applied to the resin kettle at the conclusion of the reaction and this causes a decrease in the temperature of the resin normally to within the range of about 30–60° C. As the dehydration proceeds the viscosity of the reaction mixture increases due both to the increase in solids content and the decrease in temperature. In fact, when the content of substantially petroleum hydrocarbon-insoluble pine wood resin is substantial, the viscosity of the phenol-aldehyde thermosetting resin is frequently so high that conventional commercial resin kettles have insufficient agitator capacity to provide necessary agitation during dehydration. Foaming of the phenol-aldehyde resin is also a frequent source of difficulty.

From the above facts, it is evident that the art would welcome any improvement which would facilitate the vacuum dehydration of a substantially petroleum hydrocarbon-insoluble pine wood resin-modified phenol-aldehyde thermosetting resin.

In accordance with the present invention, it has been discovered that in the vacuum dehydration of substantially petroleum hydrocarbon-insoluble pine wood resin-modified phenol-aldehyde thermosetting resins a substantial decrease in the viscosity of the resin can be effected by adding thereto prior to dehydration an amount of furfural corresponding to at least about 5% of the combined weight of the substantially petroleum hydrocarbon-insoluble pine wood resin and the phenol. The decrease in viscosity thereby achieved renders the agitation of the resin less difficult during dehydration so that standard resin kettles can be employed in the preparation of the resin. Troublesome foaming is also eliminated. The employment of furfural as a viscosity-reducing agent has the additional advantage that any furfural remaining in the modified phenol-aldehyde thermosetting resin after dehydration will react during the subsequent curing of the resin and impart greater flow properties to the resin.

In order to illustrate the invention in greater detail, the following examples are presented. Parts and percentages are by weight unless otherwise specified.

Example 1

To a reaction vessel equipped with a thermometer, agitator and reflux condenser there was added 250 parts of phenol, 187.7 parts of substantially petroleum hydrocarbon-insoluble pine wood resin, 294.7 parts of formalin (37% formaldehyde) and 24 parts of a 40% aqueous solution of sodium hydroxide. This mixture was refluxed with stirring at a temperature of about 100° C. for 2 hours and 9 minutes. At this point, the reaction had proceeded to the desired degree and 43.7 parts of furfural was added to the vessel.

The pressure in the reaction vessel was next reduced to approximately 60–65 mm. Hg and the application of vacuum was continued for 37 minutes while continually stirring the resin. Dehydration proceeded smoothly without undue viscosity increase and without noticeable foaming. Seven minutes after the beginning of the dehydration the resin temperature dropped to 46° C. although the temperature of the heating medium surrounding the reaction vessel was maintained at 107° C. Thereafter the resin temperature begain to rise slowly so that the end of the dehydration period it was 113° C. The resin was then poured into pans and allowed to cool. It solidified to a hard dark-colored material with only a faint odor of furfural. It was then pulverized and tested in the manufacture of shell foundry molds. These molds were found to have a tensile strength of 216 p. s. i. and a hardness of 65 after being cured 2 minutes at 400° C. When cured for 2 minutes at 600° C. the hardness was increased from 75 to 90.

Example 1A

The procedure of Example 1 was followed with the exception that the addition of furfural was omitted. As a consequence, the viscosity of the modified phenol-aldehyde thermosetting resin increased during dehydration to such an extent that the agitator stalled. It was noted additionally that considerable foaming was encountered.

Example 2

Into a resin kettle equipped with thermocouples, agitator and reflux condenser there was placed 2500 parts of crystalline phenol and 1875 parts of substantially petroleum hydrocarbon-insoluble pine wood resin. The mixture was agitated and the temperature in the kettle was then raised to 94° C. over a period of 50 minutes and there was added 240 parts of an aqueous 40% sodium hydroxide solution and 2947 parts of formalin (37% formaldehyde). The temperature after these additions was 98° C. In approximately one minute, reflux begain and was continued for 61 minutes at which time 437 parts of distilled furfural was added over a two-minute period.

Dehydration was next begun by applying vacuum to the kettle while agitating the reaction mixture and maintaining the temperature in the jacket of the kettle at 118° C. As the vacuum was increased to 28 inches during the next 12 minutes, the temperature of the resin dropped to 52° C. After a total of 17 minutes and maintenance of vacuum at 28 inches, the minimum temperature of 45° C. was reached. No trouble was experienced in agitating the reaction mass at any time and no foam was observed. The same conditions of jacket temperature and vacuum were maintained and the temperature in the kettle gradually rose over a period of one hour to 97° C. at which time the resin was poured from the kettle. After cooling, the resin was easily ground to a fine powder which had no tendency to revert and had a Parr bar softening point of 102° C. Foundry shell molds prepared using 7% of this resin as the binder and cured 2 minutes at 400° C. had a tensile strength of 244 p. s. i. and a hardness of 85.

*Example 2A*

Using a commercial resin kettle, the procedure of Example 2 was followed with the exception that the addition of furfural was omitted. As a consequence, the high viscosity of the resin during dehydration caused the thermocouple wells to become wrapped around the agitator shaft of the resin kettle and thus severely damaged the kettle.

*Example 3*

The procedure of Example 1 was followed in reacting 250 parts of phenol, 332 parts of formalin (37% formaldehyde), and 188 parts of substantially petroleum hydrocarbon-insoluble pine wood resin in the presence of 21 parts of water and 13.7 parts of sodium hydroxide. This mixture was refluxed for 114 minutes after which time 58 parts of furfural was added and vacuum applied to the reaction vessel.

The temperature of the reaction mixture decreased to 52° C. about 9 minutes after the application of vacuum and thereafter rose to the reflux temperature as the dehydration continued. No foaming or agitating difficulties were encountered. The dehydration required 36 minutes. The resin was then poured from the reaction vessel at a temperature of 106° C. It had a Parr bar softening point of 109° C. and analysis showed that the finished resin contained about 5% by weight of furfural.

*Example 4*

The procedure of Example 3 was followed except that the amount of furfural added was reduced to 29 parts. Some difficulty was encountered during vacuum dehydration due to the high viscosity of the resin which placed a heavy burden on the agitator. However, the viscosity of the reaction mixture was noticeably lower than a similar reaction mixture to which no furfural was added. The experiment was basically successful and indicates that an amount of furfural equal to 5% of the combined weight of substantially petroleum hydrocarbon-insoluble pine wood resin and phenol is about the minimum that can be used to effect a significant decrease in viscosity.

It can be seen from the examples that the invention provides a much needed improvement in the vacuum dehydration of substantially petroleum hydrocarbon-insoluble pine wood resin-modified phenolaldehyde thermosetting resins. The beneficial effect of the invention is especially noticeable in the dehydration of phenolaldehyde resins that are modified with an amount of substantially petroleum hydrocarbon-insoluble pine wood resin equal to at least about 20% by weight of the phenol. It makes practicable the production of modified phenolaldehyde thermosetting resins in which the substantially petroleum hydrocarbon-insoluble pine wood resin content amounts to as much as 70% by weight of the phenol.

Apart from the addition of furfural prior to dehydration which distinguishes this invention from the prior art, the usual ingredients and manipulative procedures employed in the art for the preparation of substantitally petroleum hydrocarbon-insoluble pine wood resin-modified phenol-aldehyde thermosetting resins can be employed. Thus, the phenol utilized in the preparation of the resin can be any of those used in the preparation of phenol-aldehyde resins, and the term "a phenol" is used herein to refer to phenolic compounds generally that are suitable for reacting with aldehydes to form thermosetting resins of the phenol-formaldehyde type. This class of compounds is well known in the phenol-formaldehyde art and includes phenol itself, that is, hydroxybenzene, and substituted phenols characterized by having three active hydrogen atoms (the 2,4,6 positions) attached to the ring. Thus, m-substituted phenols, for example, m-cresol, m-ethylphenol and higher alkyl m-substituted phenols or mixtures of m-substituted phenols and o- or p-substituted phenols may be utilized in this invention. Also di-substituted phenols in which the substituent groups are attached to the 3 and 5 positions of the ring are useful. Thus, 3,5-dimethylphenol, 3,5-diethyl phenol, 3,5-dipropylphenol, 3-methyl-5-ethylphenol, 3-methyl-5-propylphenol, 3-ethyl-5-propylphenol and 3,5-di-substituted phenols in which the substituents are groups having a larger number of carbon atoms may be utilized. Preferably, however, the substituents attached to the phenolic nucleus in the case of both mono-substituted and di-substituted phenols will be alkyl groups and will be lower alkyl groups, that is, alkyl groups containing less than about 8 carbon atoms. Polyhydric phenols such as resorcinol also may be used, preferably in conjunction with a monohydric phenol such as phenol itself. Phenol is the preferred phenolic compound in carrying out this invention by reason of its availability in highly pure form as well as its reactivity.

Likewise the aldehyde utilized in the process of the invention may be any aldehyde suitable for preparing phenolaldehyde thermosetting resins, and the term "an aldehyde" is used as inclusive of all such aldehydes. This class of aldehydes is well known to the art and includes, in addition to formaldehyde, compounds which are capable of engendering formaldehyde under the conditions of reaction. Thus, paraformaldehyde, hexamethylenetetramine and dimethyl formal can be used. Also included are aldehydes such as glyoxal, acetaldehyde, propionaldehyde, butyraldehyde, etc. Even furfural itself can be used as the aldehyde even though in such case the viscosity of the resultant resin is not as great as when formaldehyde is used and, hence, the benefit derived from the addition of more furfural prior to dehydration is not as significant. The advantages of the invention are most apparent when the aldehyde is formaldehyde or a compound engendering formaldehyde.

The pine wood resin used in accordance with the present invention may be defined as the substantially petroleum hydrocarbon-insoluble pine wood resin prepared, for example, in accordance with the processes of U. S. Patents to Hall, Nos. 2,193,026 and 2,221,540. This material, which is characterized herein by the term "substantially petroleum hydrocarbon-insoluble pine wood resin," is the resinous material which may be prepared from pine wood, as follows: The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present composition. Extraction of this mixture with a petroleum hydrocarbon such as, for example, gasoline, dissolves and removes the rosin. After separation of the rosin, high in abietic acid, a resinous residue remains which is low in abietic acid. Alternatively, the material obtained on evaporation of the coal tar hydrocarbon extract may be dissolved in a mixture of furfural and a petroleum hydrocarbon such as gasoline, and the two layers which form separated, in which case the substantially petroleum hydrocarbon-insoluble resin is found dissolved in the furfural phase from which it may be obtained by evaporation of the furfural. Other methods of isolating the desired petroleum hydrocarbon-insoluble pine wood resin may be employed, if desired. This resin, used in accordance with the present invention, is characterized by a dark red brown color, cherry red in solution, and by substantial insolubility in petroleum hydrocarbons, but it will vary somewhat in its specific characteristics such as acid number, melting point, exact petroleum ether solubility, and content of naphtha- and toluol-insoluble material, depending upon the details of the extraction processes utilized. This resin will meet or nearly meet the following specifications, namely, substantial insolubility in petroleum hydrocarbons, substantially complete solubility in alcohol, a methoxy content from about 3% to about 7.5% (usually from about 4% to about 6%), an acid number in the range from about 90 to about 110, and a drop melting point in the range from about 95° C. to about 125° C. (203° F. to 257° F.). This resin is a solid material and comes into commerce in the pulverized or ground form. This resin is of a phenolic character and for the purposes of this invention its molecular weight is 450.

The amount of formaldehyde or other aldehyde used in the production of the modified phenolaldehyde resins can be widely varied to provide products having the desired characteristics. The quantity of aldehyde utilized in any given instance may be expressed in terms of the total content of phenolic material in the condensation mixture. The substantially petroleum hydrocarbon-insoluble pine wood resin utilized in this invention is predominantly of a phenolic nature and for the purposes of this invention has an average molecular weight of about 450. The quantity of aldehyde utilized should be such that the molar ratio of aldehyde to the sum of the moles of the phenol and pine wood resin, i. e., the total phenolic content, is from about 1:1 to about 3:1. Preferably, the molar ratio of aldehyde to the sum of the moles of phenol and pine wood resin will vary from about 1:1 to about 2.5:1.

The reaction will take place in the absence of a catalyst but usually a catalyst will be desirable to provide a product of most suitable characteristics. As catalysts for the reaction, the usual materials used to catalyze a phenolformaldehyde reaction may be employed. Thus, either alkaline catalysts or acid catalysts may be used. Use of alkaline catalysts is preferred since they facilitate the highest degree of condensation. Thus, for example, alkaline catalysts such as ammonia, sodium carbonate, sodium bicarbonate; caustic alkali such as sodium hydroxide, potassium hydroxide; organic amines such as pyridine, methylamine, triethylamine, etc., are operable. As acids, hydrochloric acid, sulfuric acid or organic acids can be employed. The amount of catalyst used is not particularly critical and may be varied over wide limits. Usually an amount of catalyst above about 20% by weight of the total phenolic content of the reaction mixture will not be necessary and an amount of catalyst as low as 0.01% by weight of the phenolic content will be beneficial.

The amount of furfural to be added to the reaction product prior to dehydration should be at least about 5%, preferably at least about 10%, of the combined weight of phenol and substantially petroleum hydrocarbon-insoluble pine wood resin. There is no critical upper limit on the amount of furfural that may be used since furfural is removed with the water during the dehydration.

The general procedure for reacting the phenol, the aldehyde and the substantially petroleum hydrocarbon-insoluble pine wood resin is well known to the art and comprises simply agitating the reactants in aqueous medium, preferably in the presence of a catalyst. More details on the procedure can be found in U. S. Patent No. 2,324,758 to Charles W. Bowden, Jr. Generally, the reaction is carried out at a temperature within the range of about 20° C. to about 200° C. and preferably about 80° C. to about 110° C. The reaction time will be directly dependent on the temperature employed and will usually be within the range of about 1–24 hours. The reaction is continued until the desired degree of condensation has been obtained and the product resin is of suitable character for use.

What we claim and desire to protect by Letters Patent is:

1. In the vacuum dehydration of a thermosetting resin prepared by the reaction of a phenol, an aldehyde and substantially petroleum hydrocarbon-insoluble pine wood resin in aqueous medium, the improvement which comprises adding to the reaction product prior to dehydration an amount of furfural equal to at least about 5% of the combined weight of phenol and substantially petroleum hydrocarbon-insoluble pine wood resin.

2. In the vacuum dehydration of a thermosetting resin prepared by the reaction of phenol, formaldehyde and substantially petroleum hydrocarbon-insoluble pine wood resin in aqueous medium, the improvement which comprises adding to the reaction product prior to dehydration an amount of furfural equal to at least about 5% of the combined weight of phenol and substantially petroleum hydrocarbon-insoluble pine wood resin.

References Cited in the file of this patent

UNITED STATES PATENTS

| | | |
|---|---|---|
| 2,193,026 | Hall | Mar. 12, 1940 |
| 2,566,851 | Novotry et al. | Sept. 4, 1951 |